Jan. 6, 1931.          C. A. NICKLE          1,788,247
REGULATING SYSTEM
Filed Dec. 24, 1928
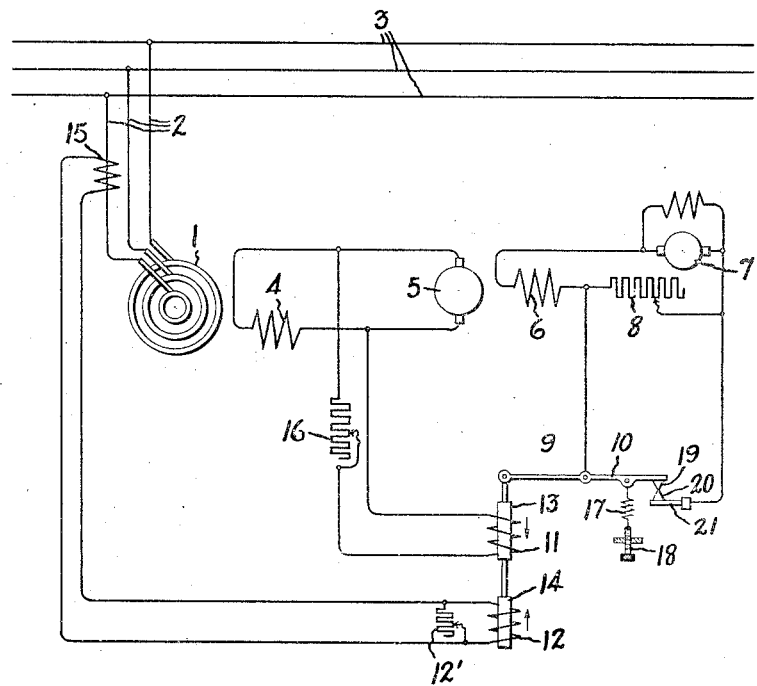
Inventor:
Clifford. A. Nickle
by Charles W. Mullan
His Attorney.

Patented Jan. 6, 1931

1,788,247

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

REGULATING SYSTEM

Application filed December 24, 1928. Serial No. 328,097.

My invention relates to regulating systems for alternating current dynamo-electric machines and more particularly to regulating systems for synchronous motors.

Synchronous motors for industrial applications unless utilized for power factor control are ordinarily operated without automatic means for controlling the field excitation and are arranged to have a field excitation sufficiently high to operate satisfactorily without breaking from synchronism under any contemplated sustained or momentary overloads. This requires a constantly applied reserve field excitation. Since the size of synchronous motors is largely determined by the field excitation requirements, a constantly applied reserve field excitation requires a larger field structure and consequently a lower motor efficiency and a larger motor frame for a given permissible temperature rise than would be the case if the motor were equipped with automatic means to vary the field excitation in accordance with the load imposed upon the motor at each instant.

My invention is particularly adapted for use in connection with a synchronous motor operated from a source of supply having a constant voltage irrespective of the load current demanded by the motor. It seems expedient at the outset to consider briefly the theory of operation of the synchronous motor which is pertinent to my invention. As a synchronous motor must operate in exact synchronism with the supply line if it operates at all, it will have a constant average speed irrespective of its load or field strength. An increase of field strength will cause an increase in motor counter-electromotive force or some other internal voltage of the motor whereas a decrease will cause the opposite result. The motor counter-electromotive force to which reference is made is nominal only and is intended to designate the electromotive force that would be produced by the field current of the motor, in the absence of armature reaction, if the saturation curve were a straight line. When the motor is loaded the motor voltage drops back in phase with respect to the line voltage and this phase displacement increases with increased load until a point is reached at which an increase of displacement angle will not furnish enough additional current to take care of the load. The voltage causing current to flow in the armature circuit of the motor is the resultant of the line and motor volts. This voltage is active in forcing the current through the impedance of the armature which is the so-called synchronous impedance made up of the resistance of the armature, the self-inductance of the armature windings and the reaction of the current in the armature coils on the field flux. With a given line voltage and constant field excitation the displacement angle increases as the load increases. Furthermore, the breakdown power varies substantially directly with the motor excitation. Therefore, with a given line voltage and a field excitation which increases as the load current increases the power at breakdown will be much greater than it would be with constant excitation. If the motor were running over-excited so that at normal load it had a small displacement angle, it would stand a much greater overload than if running either at unity power factor or lagging, as the angle would have a greater swing before it approached the breakdown point. This condition of operation however requires a larger field structure and larger motor frame than is required when the field excitation of the motor is controlled in accordance with my invention. With a constantly applied reserve excitation the motor is over-excited a large percentage of time and the power factor is varying continuously with variations in load. On the other hand, when a synchronous motor is controlled in accordance with my invention the power factor is maintained substantially constant at all loads thus securing better efficiency at light loads with the additional advantage of keeping the motor in step upon the occurrence of dips in voltage.

It is an object of my invention to provide an improved regulator and system of regulation for synchronous motors whereby a smaller motor may be used for a given industrial application than would be required in accordance with the practice which has heretofore been standard or whereby the load imposed upon a given size of motor may be increased to an amount which would otherwise be prohibitive for satisfactory operation.

Another object of my invention is to provide an improved regulator and system of regulation for controlling the field excitation of a synchronous motor in accordance with the variations in its load circuit.

The novel features which I believe to be characteristic of my invention are set forth with particularity in the appended claims, the invention itself, however, both as to organization and method of operation together with further objects and advantages thereof will best be understood by reference to the following description taken in connection with the accompanying drawing in which the single figure is a diagrammatic illustration of a regulator and system of regulation embodying my invention.

Referring to the single figure of the drawing, the regulator is shown as applied to a three-phase synchronous motor. This machine is indicated conventionally at 1 and is connected by means of conductors 2 to a source of alternating current which is indicated by conductors 3. The field winding 4 of the motor is in the present instance excited by direct current from a suitable direct-current exciter 5 which is provided with a field winding 6. As will occur to those skilled in the art the field winding 6 may be connected in shunt to the armature of the exciter 5 without departing from my invention in its broader aspects but it is preferably connected, as shown, across an auxiliary source of direct current shown as a direct-current sub-exciter 7. A variable resistor 8 is connected in series with the field winding 6 for controlling the voltage of exciter 5 and thereby the excitation of the synchronous motor.

In accordance with my invention a regulator 9 is connected to be responsive to an electrical characteristic, preferably the voltage, of the field winding 4 and to the current supplied to the motor 1 for controlling the energization of field winding 6 and thereby the energization of the motor field winding 4. The regulator 9 is preferably of the vibratory type and includes a pivoted vibratory member 10 which is arranged to be operated by electro-magnetic means comprising solenoids 11 and 12 for actuating plungers 13 and 14 respectively. The plungers 13 and 14 are mechanically connected together and in turn connected to the vibratory member 10. The solenoid 11 is connected to the excitation circuit so that the current through the solenoid is proportional at any instant to the voltage impressed across the motor field winding 4, and the solenoid 12 is connected through a suitable current transformer 15 operatively associated with one of the conductors 2 to be energized in accordance with the current supplied to the motor. The solenoid 12 is also arranged to act in opposition or differentially with respect to solenoid 11. A variable resistance 16 is connected in series with the solenoid 11 in order to provide a means whereby the action of the regulator may be adjusted. A similar adjustment may be made by adjusting a variable resistor 12' which is connected in parallel with solenoid 12. The pivoted member 10 is subjected to a downward pull on the left hand end, as viewed in the drawing, by a pull which is a resultant of the pulls of solenoids 11 and 12 respectively and this resultant pull is opposed by a suitable means, such as the spring 17, which acts on the opposite end of member 10. It is preferable to provide means for adjusting the pull of the spring 17 in order to adjust the action of the regulator and for this purpose I provide an adjusting screw 18 which is arranged to change the tension of the spring. A contact 19 is mounted on the member 10 and is arranged to cooperate with a stationary contact 20 which is preferably resiliently mounted, as shown in the drawing, on a plate spring 21.

The law of the motor operation under control in accordance with my invention may be expressed approximately by the equation:

$$(I_f)^2 - (I_a)^2 = C$$

where $I_f$ = field current
$I_a$ = armature current
$C$ = a constant

The value of the constant is fixed by the tension of spring 17. To those skilled in the art and familiar with synchronous motor theory the scope of my invention will be readily apparent. This law results in giving the motor approximately the same power factor at all loads if a normal setting of the spring is employed.

The operation of the illustarted embodiment of my invention is substantially as follows: It will be assumed that the supply line is energized and furnishes a constant supply voltage and that the motor is opearting to drive a given load (not shown). The resultant pull of the regulator solenoids 11 and 12 is adjusted by means of the variable resistor 12' and the variable resistor 16 with respect to the tension of the spring 17 so that for a given load the regulator will operate to energize the field winding 4 in a manner to hold a predetermined relation between the field excitation and the motor current. The particular relation between the field excitation and motor current that may be chosen depends upon the conditions of operation desired.

Analytically one may consider the voltage conditions in a synchronous motor as portrayed by a voltage vector representing the line voltage and a voltage vector which represents the counter-electromotoive force or nominal voltage of the motor displaced therefrom by a voltage vector corresponding to the synchronous impedance of the motor. By suitable adjustment of the pull of the solenoids and the tension of the spring the regulator may be adjusted to hold constant an internal voltage of the motor at any point between the voltage vectors representing the line voltage and the motor voltage. For many industrial applications it is believed sufficient to have the regulator adjusted to hold constant the voltage, so to speak, just inside of the transient reactance of the motor; that is, to vary the excitation to neutralize substantially the armature reaction so that the flux linkages of the field winding remain constant. The magnitude of the flux linkages to be held constant is determined by the relative strength of the pulls between solenoids 11 and 12. The resultant pull of these solenoids is adjusted by means of the variable resistors 12' and 16. The point between the applied voltage vector and the motor voltage vector at which the voltage is to be maintained constant is determined by the opposing pull of spring 17 which is adjusted by means of the adjusting screw 18.

The pivoted lever 10 is subjected to a downward pull on the left hand end, as viewed in the drawing, by the resultant pull between solenoids 11 and 12. This pull is opposed by the spring 17. Contact 19 which is operated by the pivoted lever 10 cooperates with contact 20 to short circuit or open circuit a circuit in shunt to the regulating resistor 8. For simplicity of illustration, these contacts are shown as operating directly across the resistor 8 but the well known intermediate relay which is controlled by these primary contacts would no doubt be used in practice. With the initial adjustment and given load current referred to hereinbefore the contact 19 will vibrate to and from contact 20 with a given ratio of time opened to time closed in the well known manner of a Tirrill-type of regulator and hold a constant average voltage across the motor field winding 4. The pull of solenoid 11 which is determined by this average exciter voltage must be just sufficient when modified by the pull of solenoid 12 which is determined by the motor current to overcome the pull of spring 17. The operation of the motor will then proceed in substantially the same manner as if a manually operated motor field rheostat were placed in a given position for a given load. Now assume the load on the motor is increased. The motor current will increase and consequently the energization of solenoid 12 will increase. Solenoid 12, however, acts in opposition or differentially with respect to solenoid 11 and as a result the pull opposing the pull of the spring 17 is decreased. Therefore in order to maintain the average pull on the lever 10 equal to the pull of spring 17 the pull of solenoid 11 must increase which means that the average exciter voltage must increase. The contacts of the regulator cease vibrating until this restoration of the balance of pulls is effected. As a result the excitation applied to the field winding 4 is increased in one vibration of the contacts in accordance with the increase in the motor current. If, on the other hand, the load on the motor decreases the resultant pull due to the solenoids will increase so that the regulator will decrease the voltage applied to the motor field winding as will be evident from the description previously given for an increase of load.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a source of alternating current, a synchronous motor connected thereto, a field winding for said motor, and regulating means having a main control element operated in accordance with the current supplied to said motor and the voltage of said field winding for maintaining the power factor of said motor substantially the same throughout the operating range of said motor.

2. In combination, a source of alternating current, a synchronous motor connected thereto, a field winding for said motor, a regulator having a main control element provided with a plurality of differentially acting operating coils energized respectively in accordance with the current supplied to said motor and the voltage of said field winding, and means controlled by said control element for regulating the energization of said field winding.

3. In combination, a source of alternating current, a synchronous motor connected thereto, an excitation circuit for said motor, a vibratory regulator comprising cooperating movable contacts for controlling the voltage of said excitation circuit, means responsive to both the voltage of said excitation circuit and the current supplied to said motor for actuating one of said contacts in a manner to vary said excitation voltage proportionally to the value of the current supplied to said motor.

4. In combination, a source of alternating current, a synchronous motor connected thereto, a field winding for said motor, a vibratory lever system having cooperating contacts for controlling the energization of said field winding, an electromagnet responsive to the voltage of said field winding and an electromagnet responsive to the current supplied to said motor for actuating one contact of said lever system, and means operatively associated with said lever system for balancing the action of said voltage responsive electromagnet and said current responsive element when a predetermined relation exists between the voltage of said field winding and the current supplied to said motor.

5. In combination, a source of alternating current, a synchronous motor connected thereto, a field winding for said motor, a vibratory lever system having cooperating contacts for controlling the energization of said field winding, an electromagnet responsive to the voltage of said field winding and an electromagnet responsive to the current supplied to said motor actuating said lever system for maintaining substantially constant the flux linkages of said field winding during any change in the load current of said motor within its operating range, and adjustable means opposing the action of said electromagnetic means for predetermining the magnitude of the flux linkages to be held constant.

6. In combination, a source of alternating current, a synchronous motor connected thereto, a field winding for said motor, a vibratory lever system having cooperating contacts for controlling the energization of said field winding, an electromagnet responsive to the voltage of said field winding and an electromagnet responsive to the current supplied to said motor for actuating said lever system for maintaining substantially constant a predetermined internal voltage of said motor, and means for predetermining the point between the voltage applied to said motor and the nominal voltage of said motor at which said internal voltage is maintained substantially constant.

7. In combination, a source of alternating current, a synchronous motor connected thereto, a field winding for said motor, a vibratory lever system having cooperating contacts for controlling the energization of said field winding, an electromagnet responsive to the voltage of said field winding and an electromagnet responsive to the current supplied to said motor for maintaining substantially constant a predetermined internal voltage of said motor, and a variable resistance in series with said voltage responsive electromagnet for predetermining the point between the voltage applied to said motor and the nominal voltage of said motor at which said internal voltage is maintained substantially constant.

In witness whereof, I have hereunto set my hand this 21st day of December, 1928.

CLIFFORD A. NICKLE.